3,386,929
SEALING COMBINATION COMPRISING BUTYLENE POLYMER, FILLER, ACID AND POLYVINYL ACETATE
Henri Brunel, 9 Rue du General Niox,
Paris 16eme, France
No Drawing. Filed Oct. 8, 1963, Ser. No. 319,915
Claims priority, application France, Oct. 12, 1962,
942,844
6 Claims. (Cl. 260—4)

The invention relates to a combination of sealing products with a view to providing a perfectly waterproof, very long lasting joint, particularly between glass and metals and especially for the tight fixing of large glasses in curtain-walls.

Nevertheless the applications of the invention are not limited to curtain-walls and the combination of sealants hereinafter described may be used for providing tight joints between diverse materials, besides glass and metal, used in the building industry, for example: wood, concrete, stone, brick and plastics and between such materials and glass. Some of these sealants are also useful in diverse wood industries such as frame work, ship-building, furniture and veneering, and also for waterproofing of certain materials such as paper, cardboard, plaster, etc.

One feature of the invention is that the edge of the glass portion (pane of glass) which must be jointed with the metal or other material is literally implanted in a smooth, sticky, very adherent, non-shrinking, non-leaking and strictly waterproof and vapour-proof layer of a bedding material filling the bottom of the groove in which the glass is inserted and of which the compactness, plasticity and elasticity vary only in a small degree after having been in use for a very long time which may exceed ten years even when the temperature varies within a range exceeding the range of the extreme atmosphere temperatures in summer and in winter.

This bedding layer, or plastic bath, which adheres perfectly to both metal and glass is, in some manner, tamped into the bottom of a metal container which is open to the atmosphere and in which the edge of the glass is implanted and maintained by keys or wedges. And, another feature of the invention is to provide for a waterproof, elastic, plastic and mechanically resistant obturator material for this container, i.e., an obturator material which forms a membrane that is strongly adherent, on the one hand, to the metal and on the other hand to the glass, so that any deformation due to the differences of dilation coefficient between glass, metal and bedding joint cannot cause any deformation, rupture or unsticking of this membrane; and the shocks or scratches due, for example to raindrops, hail granules or bird claws are not able to deteriorate the surface of this membrane. Furthermore, this membrane has a neat, polished and non-sticky surface in order not to catch and keep, when not painted, the dusts or impurities of the atmosphere. Besides, after application, this membrane dries rapidly thus limiting the risks of deterioration which may occur while it is soft.

These aims are fully reached according to the invention by the special compositions comprising a bedding material and an obturating material which, in the combination as described hereabove, provides a perfectly waterproof and vapour-proof, very resistant and very long lasting joint.

The bedding material is constituted, as to the waterproofing, adherent and viscous phase, of very viscous but not solid butylene high polymers having molecular weights of 1500 to 2500. To this liquid phase, there is mixed a solid phase or filler constituted of pulverulent rocks and, besides, there is added, to provide for good mixing of the phases and a suitable compactness for use, a third constituent which acts, on the one hand as a wetting agent and on the other hand as a hardening agent by combining with a part of the filler. This third constituent is selected from: drying oil acids, fatty, resinic and tall oil acids, and naphthenic acids. The filler comprises an active part able to combine with said third constituent and an inert part which is only to increase the compactness of the butylene high polymers and to transform them into a very adherent but easy to manipulate paste having no more the ropy consistency of the said butylene high polymers. The active part of the filler is calcium carbonate in fine powder form. It gives a calcium salt with the drying oil acids, thus causing a certain hardening of the paste. The inert part is preferably amianthus in fine powder form, on account of its absorbing properties, but any other neutral rock in fine powder form may also be added.

The obturating material is constituted, as essential components, of a homopolymer, highly plastified, concentrated aqueous emulsion of polyvinyl acetate and a filler constituted of a pulverulent rock, preferably amianthus, intimately mixed with the said emulsion, and, as optional components, an aqueous alcoholic solution in which the alcohol has less than 4 carbon atoms, an ammonia salt of a copolymer of polyvinyl acetate and crotonic acid, and a concentrated aqueous emulsion of natural rubber such as artificial latex.

Thus, the invention consists in a combination of sealants for building materials and especially for providing perfectly tight, very long lasting, glass-metal joints for the curtain-walls, comprising: on the one hand a bedding material in which the edge of the glass is implanted, constituted of butylene high polymers having molecular weights between 1500 and 2500, to which is incorporated a filler comprising an active part constituted of calcium carbonate in powder form and an inert part constituted of a pulverulent rock and of a third component selected from the group consisting of: drying oil acids; fatty, resinic and tall oil acids; naphthenic acids; and, on the other hand, an obturating material which is applied over the bedding material and which is constituted, as to essential components, of a highly plastified, concentrated polyvinyl acetate emulsion to which is incorporated a pulverulent rock and, as to optional components, an aqueous alcoholic solution in which the alcohol has less than four carbon atoms, an ammonia salt copolymer of acetate and of crotonic acid of a molecular weight of about 100,000, in which the proportion of crotonic acid is between 5% and 10%, preferably the copolymer sold under the commercial appellation and registered trademark MOWILITH CT 5A, and a concentrated aqueous emulsion of natural rubber.

Compared to other known sealants, my combination of sealants presents several advantages. First, it is manufactured and sold in a form ready for use, without any mixing or other operation to be effected before applying as it is the case, on the contrary, with other sealants such as, for example, polysulfides or polyurethanes which have to be mixed with a catalyst before use and which must be employed within a relatively short time after this mixing.

Another advantage of my combination of sealants is to provide for a double security as to the tightness of the joint with regards to water and vapours. In fact, the bedding material applied to the edge of the glass has all the properties of a liquid joint in regard to waterproofing and vapourproofing, since its chemical nature, its consistency and its adhesive properties provide a perfect moulding and adherence between the surfaces to be joined, so that any leak of any kind is impossible. Besides, the resistant obturating membrane formed over this soft joint by the plastic and elastic layer of obturating mastic protects it against deteriorations and, moreover, constitutes a second water tight joint, thus increasing the security of the whole.

Furthermore, the use of butylene high polymers instead of lower polymers as employed in other known sealants and the incorporation of a third material giving a hardening combination avoids any tendency to flowing of the bedding product, for example under the action of an important increase of the temperature due to the heat accumulated in the metal frames exposed to the sun in summer. Practically, the bedding materials according to the present application are resistant to flowing at temperatures of 80°–110° C. and no important deformation of the mass is observed up to 130° and even 150° C.

Another advantage of my combination of sealants is that the bedding material is a practically non drying product having thus absolutely no shrinking and the obturating material which is in contact with the atmosphere is a rapidly drying product which may be exposed to water a few hours after applying and for which the shrinking, which is not excessive, is easily compensated by its elasticity. For illustrating the rapid increasing of the resistance of the joint one may say that frames with fresh sealed glass can be moved and transported two hours after applying the joint.

It must be still emphasized that the materials according to this application, and especially the obturating materials may be tinted with coloured fillers or pigments or with dyes. Particularly, aluminium powder, preferably coated with protective compounds, may be incorporated in said materials so that the joint appears of the same colour as the frame.

Finally, and above all from the economical point of view, the joints according to this application are three to six times cheaper than those made with the sealants of same quality commonly used, especially those cited above.

As to other uses of the products according to this application, the same combination may be employed as sealant between diverse materials, as stated in the preamble, especially for sealing of cracks and also for rapid and long lasting repairs of other deteriorated joints. Besides, the obturating compositions may be used as pastes for diverse materials and especially as pastes for wood. Given that they penetrate into the pores of the wood, they provide a very resistant, though plastic, joint strongly rooted in the two surfaces to be joined and which, due to its elasticity and plasticity, cannot be broken or to split under the action by shocks or of the tendency to deformation of wood. They may be very useful in framework, ship building, and more especially in furniture and veneering industries. They may be also used for tight sealing of food wrappages, for waterproofing, by incorporation or by coating, of materials, for instance of paper, cardboard, or plaster. By incorporating granular fillers, there are obtained coating products for the building industry.

I will now give examples of the combination of sealants described above and of applications of this combination and of the ingredients of which they are constituted.

(1) 650 kilograms of butylene high polymers having a medium molecular weight of 1900 are mixed, first with 400 kilograms of calcium carbonate as a fine powder and then with 100 kilograms of distilled tall oil. To the homogeneous paste obtained there are incorporated 700 to 1000 kilograms of amainthus as a fine powder. After complete mixing, there is obtained a very adhesive, compact but very malleable paste having a very high cohesion and which constitutes an excellent bedding material according to this application for applying with a gun in the grooves of curtain-walls where the edge of the glass is to be inserted.

A protective and also waterproofing obturating material for applying over this bedding sealant is obtained by mixing 1000 kilograms of an aqueous emulsion of polyvinyl acetate at 50–60% concentration by wt., having a fineness of about $0.2\mu$ which is plastified with at least 10% of dibutylphthalate, with 400 to 500 kilograms of amianthus in the form a very fine powder. A 2 to 5 millimeters thick layer of the paste thus obtained is applied over the bedding product which fills the groove where the glass is inserted. This rapidly drying layer constitutes a plastic and elastic membrane strongly adherent to the glass and to the metal, which is perfectly waterproof and resistant to external causes of deterioration. The resistance thereof increases rapidly and reaches its final degree after a few days. The white paste may be coloured either with pigments or dyes or, still more simply by using a coloured filler which may be selected from metal oxides or salts in powder form, for instance iron oxide, or cadmium sulfide, or still with aluminium powder preferably coated with petrolatum or waxes.

(2) To the obturating material obtained as in Example 1, there are added 150 to 200 kilograms of the ammonium salt of a copolymer of vinyl acetate and crotonic acid in solution in aqueous methyl alcohol and 100 to 200 kilograms, according to the compactness desired, of an aqueous emulsion of natural rubber at 60–65% concentration by wt. There is obtained a smooth paste suitable for gun application, which gives, after drying, a strongly waterproof, adherent and very elastic membrane having also a good mechanical resistance and which constitutes a good obturator, especially in the cases where elasticity is desired for the external part of the joint between glass and metal, for instance where strong vibrations of the frame or important deformations due to large and repeated variations of the temperature are expected.

(3) In the obturating material according to Example 1 or 2, the proportion of the filler is decreased from 30 to 95% by weight and the paste is diluted from 10 to 50% by weight with water. There are obtained fluid pastes for waterproof and vapourproof closing of food wrappages or for wood adhesives in the furniture and veneering industry.

(4) The composition constituting the obturating material as in Examples 1 or 2 is mixed with paper pulp during the manufacturing of paper, for obtaining waterproof paper. Or the same product is applied to the surface of the paper, cardboard, or similar material to be waterproofed.

(5) The composition constituting the obturating material as in Examples 1 or 2 is introduced in small proportion, generally less than 2%, in concrete for improving the resistance against vibrations and freezing.

(6) The composition constituting the obturating material as in Examples 1 or 2 is mixed with a granulous or powdered filler such as sand or sand with cement, or with plaster. Coloured pigments may be added. There are obtained waterproofing coating products for the building industry.

What I claim is:
1. A combination of sealants for building materials, whereby a stable, leakproof seal that is especially useful for joints between glass and metal is obtained, comprising
(1) a bedding material comprising 100 parts of butylene homopolymers having molecular weights of about 1500 to 2500 and 180–230 parts of a filler, said filler consisting essentially of
 (a) 100–160 parts of neutral powdered rock,
 (b) 55–65 parts of powdered calcium carbonate, and
 (c) 13 to 17 parts of acidic materials selected from the group consisting of fatty acids, rosin and naphthenic acids and mixtures thereof, and
(2) an obturating material that is applied over said bedding material, said obturating material comprising 100 parts of polyvinyl acetate latex and 40–50 parts of neutral powdered rock, said latex comprising 50–60 parts of polyvinyl acetate having a particle size of about 0.2 micron, at least about 10 parts of dibutyl phthalate and 40–50 parts of water, all parts being by weight.

2. The combination of sealants as set forth in claim 1, wherein said obturating material comprises in addition, 10–15% by weight of an aqueous alcoholic solution of an ammonium salt of a copolymer or vinyl acetate and crotonic acid having a molecular weight of about 100,000 in which the proportion of crotonic acid is between 5 and 10% and 10–20% of a concentrated aqueous emulsion of natural rubber.

3. The combination of sealants as claimed in claim 1, wherein at least one of said materials (1) and (2) comprises coloring components selected from the group consisting of pigments, dyes, colored fillers and metal powders.

4. The combination of sealants as claimed in claim 2 wherein at least one of said materials (1) and (2) comprises coloring components selected from the group consisting of pigments, dyes, colored fillers and metal powders.

5. As a coating composition for the building industry a composition comprising 100 parts of polyvinyl acetate latex, 40–50 parts of neutral powdered rock, 10–15 parts of an aqueous alcoholic solution of an ammonium salt of a copolymer vinyl acetate and crotonic acid having a molecular weight of about 100,000 in which the proportion of crotonic acid is between 5 and 10%, and 10–20 parts of a concentrated aqueous emulsion of natural rubber.

6. The composition as claimed in claim 5 comprising in addition a filler material selected from the group consisting of sand, cement and plaster.

References Cited

UNITED STATES PATENTS

| | | | |
|---|---|---|---|
| 2,833,737 | 5/1958 | Mark et al. | 260—29.6 |
| 2,887,460 | 5/1959 | Dibert et al. | 260—29.6 |
| 3,010,929 | 11/1961 | Jones | 260—29.6 |
| 3,196,122 | 7/1965 | Evans | 260—29.6 |
| 2,131,342 | 9/1938 | Baldeschwieler | 260—41 |
| 2,375,388 | 5/1945 | Ryan | 260—41 |
| 2,400,565 | 5/1946 | Merrill | 260—4 |
| 2,483,797 | 10/1949 | Van Valkenburgh | 260—23.7 |
| 2,720,496 | 10/1955 | Bushnell | 260—29.6 |
| 2,733,995 | 2/1956 | Robinson | 260—23 |
| 2,986,544 | 5/1961 | Driscoll | 260—29.7 |
| 3,050,497 | 8/1962 | Young | 260—897 |

OTHER REFERENCES

Payne, "Organic Coating Technology," vol. II, 1961, pp. 791–794.

Turner, "The Condensed Chemical Dictionary," 1950, p. 697.

JAMES A. SEIDLECK, *Primary Examiner.*

DONALD E. CZAJA, GEORGE F. LESMES, LEON J. BERCOVITZ, *Examiners.*

R. A. WHITE, *Assistant Examiner.*